Feb. 28, 1961　　　　J. W. SHAW　　　　2,973,209
SAFETY MEANS TO ELIMINATE OVERTURNING OF
TRACTORS AND LIKE MOTIVATED VEHICLES
Filed July 24, 1958　　　　　　　　　　　4 Sheets-Sheet 1
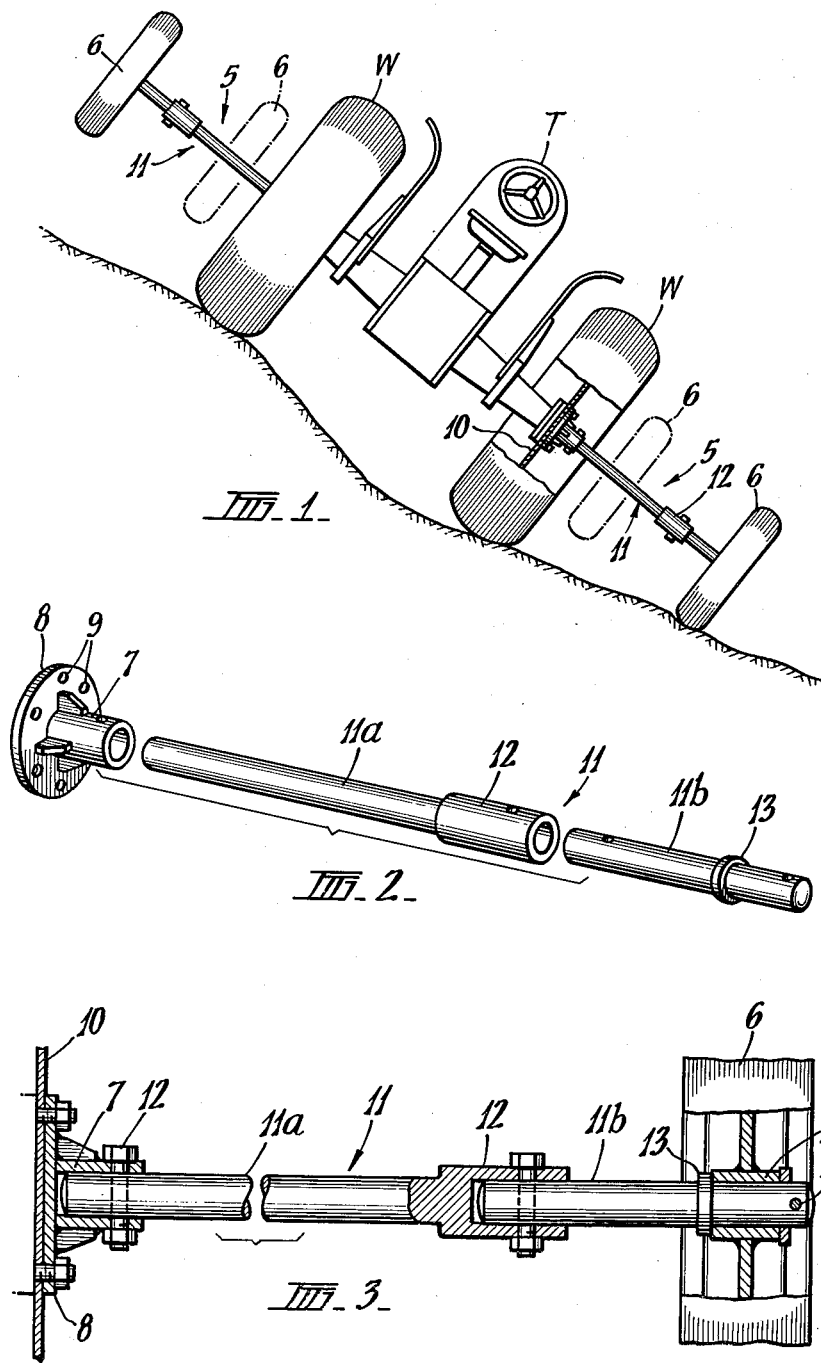

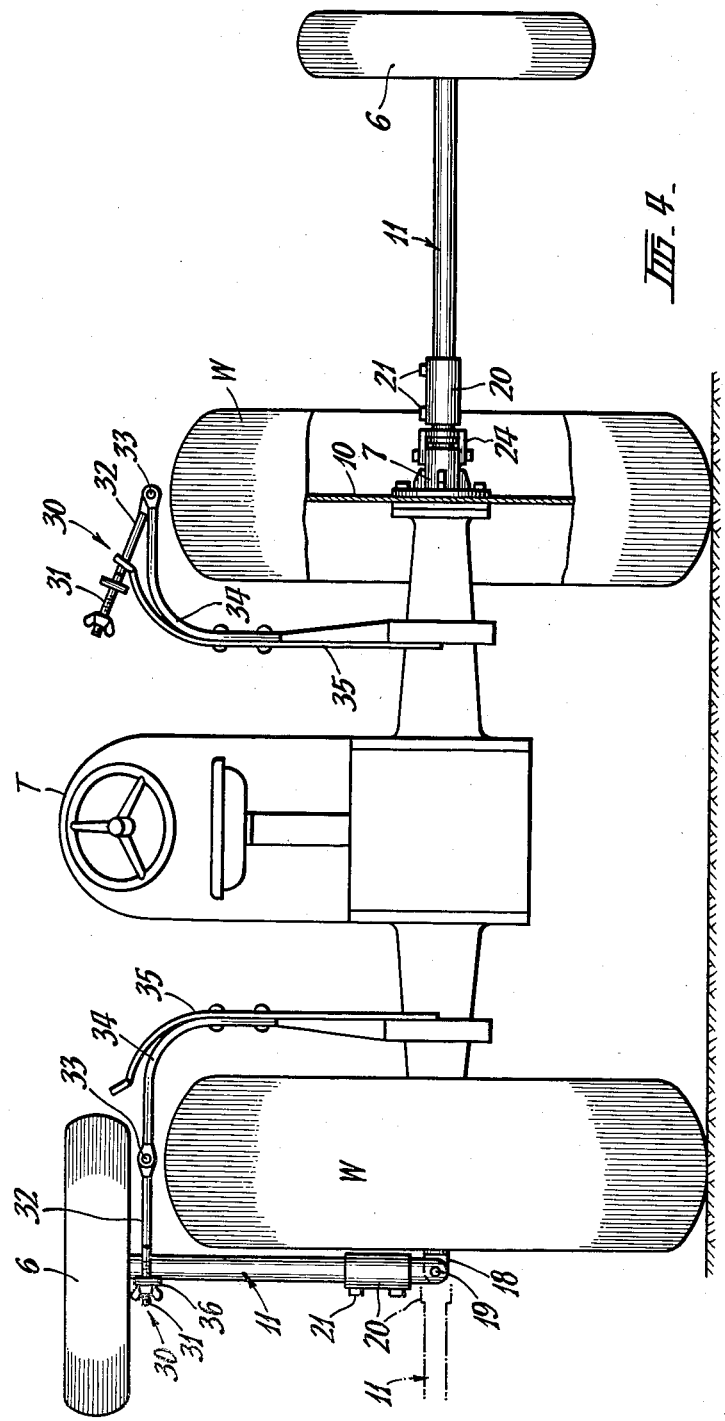

Feb. 28, 1961

J. W. SHAW 2,973,209

SAFETY MEANS TO ELIMINATE OVERTURNING OF
TRACTORS AND LIKE MOTIVATED VEHICLES

Filed July 24, 1958

United States Patent Office 2,973,209
Patented Feb. 28, 1961

2,973,209
SAFETY MEANS TO ELIMINATE OVERTURNING OF TRACTORS AND LIKE MOTIVATED VEHICLES

John William Shaw, Fitzgerald Road, Laverton, Victoria, Australia

Filed July 24, 1958, Ser. No. 750,809

Claims priority, application Australia July 25, 1957

16 Claims. (Cl. 280—150)

The operation of tractors and like motivated vehicles such as front end loaders, upon steep hillsides or inclined ground has in the past been responsible on occasions for the sideward overturning of the tractor to the serious danger of the driver.

The tractor when travelling across on a steep incline or hillside has the tendency to slip "downhill" and should the inclination be suddenly increased by an obstruction, declivity or recess on the "downhill" side, there is developed a dangerous inclination tending to cause the tractor to topple sidewardly or overturn.

This is a constant source of danger to a driver operating under such conditions and thus it is the principal objective of the present invention to provide simple and effective safety means to prevent the sideward falling or overturning of the vehicle or tractor when operating upon inclines or hillsides, to thereby stabilize the tractor and protect the driver from injury.

A further objective of the invention is to provide simple and conveniently operable means, either manually, or power actuated to move the ground engageable member of the safety stabilizing means between an outer operative and inner transport or a parked position.

With the ground engageable member in the inner parked position the overall width of the vehicle or tractor and safety stabilizing means assembly is reduced to permit the latter to freely pass through gateways or fence openings in travelling to and from the working site.

A further objective of the invention is to provide such an effective safety stabilizing means adapted for convenient attachment to the vehicle or tractor without the requirement of any structural variation.

With the above stated objective in view there is provided according to this invention in a tractor or like power motivated vehicle, a safety means to prevent sideward falling or turning over of said vehicle comprising a coaxial stabilizing support carried upon each one of the pair of main transport wheels of the vehicle in a transport position above ground level, said support constructed and disposed so as to contact the ground and move with and stabilize the vehicle upon the latter assuming a critical inclination when traversing an incline or hillside.

Thus should the vehicle or tractor when travelling across an incline, tend to assume a dangerous inclination by "dropping" on the lower side, the above ground engageable support is brought into ground engagement at that side consequent upon the inclination of the tractor so as to prevent further tilting or inclination of the latter.

The vehicle or tractor is then effectively stabilized to permit the driver to take appropriate action for his personal safety and care of the tractor by either stopping the tractor or vehicle, or driving out of, or backing from the particular position.

The accompanying drawings depict several practical arrangements of the stabilizing support for a tractor or like power motivated vehicle according to this invention.

In these drawings:

Fig. 1 is a view in rear elevation of the stabilizing support upon one main wheel in the operative position in which the tractor has assumed a critical inclination at which it would have normally overturned or toppled sidewardly down the incline.

Fig. 2 is a perspective view of one of the stabilizing supports removed from the tractor, and omitting the ground engageable wheel.

Fig. 3 is a plan view partly in section of the stabilizing suport.

Fig. 4 is a rear elevation of the tractor and an attached modified construction of stabilizing support adjustable to permit the ground engageable wheel to be manually moved from an outer operative position to an inner and upper transport or parked position to reduce the overall width of the tractor and stabilizing support assembly when travelling to and from the working site or location.

Figure 5:
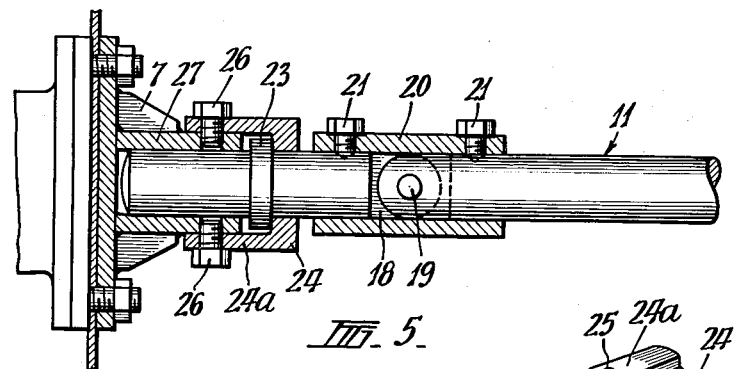
Fig. 5 is a view in section of the divided axle of the stabilizing support to permit the location of the ground engageable wheel in either the operative or parked position, each of which location is illustrated in Fig. 4.

Referring now to Figs. 1 to 3, a stabilizing support indicated generally at 5 is detachably mounted in coaxial relation with the axle of each main wheel W of the tractor T, whereby should the tractor assume a critical inclination towards either side, it will be stabilized against overturning in the downward direction of the inclination by the particular ground engageable wheel 6, upon contacting the ground.

As viewed in Figs. 2 and 3, each stabilizing support, one only of which will be described, consists of an inner cast socket 7 having a flange 8 apertured as at 9 for bolting to the wheel centre 10 of the tractor wheel W in axial alignment with the axle of the latter as viewed in Fig. 3.

The socket 7 may constitute a permanent attachment to the wheel centre 10 to facilitate the convenient attachment of the stabilizing support when required.

An axle 11 constituting an axial extension of the tractor wheel W is fitted into, and bolted as at 12 to the socket 7.

The axle 11 of uniform diameter is divided, the inner section 11a being formed with a socket 12 to receive the outer section 11b which carries the ground engageable wheel 6.

The inner axle section 11a is bolted to the outer section 11b to permit the latter to be detached with the ground engageable wheel 6, and upon the inner axle section 11a being withdrawn from the socket 7, the outer section 11b may be inserted in the latter to reduce the overall width of the tractor and stabilizing support assembly. The inner axle section 11a is then carried upon the tractor until the stabilizing support is required.

The complete axle 11 and ground engageable wheel may be detached from the socket 7 upon withdrawal of the bolt 12.

The outer axle section 11b is formed with a collar 13 to locate the hub 14 of the ground engageable wheel 6, upon the axle, said wheel being free upon the axle section 11 and retained in position by the collar 14 and diametrical pin 15.

Thus the ground engageable wheel 6 does not rotate with or upon the axle 11 until it assumes ground engagement as viewed in the right hand side of Fig. 1.

The ground engageable wheel 6 is rubber tyred and will revolve upon contacting the ground to travel with the tractor to thus stabilize the latter against further inclination or slewing with consequent danger of sideward toppling over. The driver consequent upon the revolving of the ground engageable wheel 6 maintains control of the tractor to continue or vary the direction of travel, or back to return the tractor to normal as illustrated in Fig. 4.

Referring now to the modification illustrated in Figs. 4 and 5, the axle 11' is divided as at 18 with the ends pivotally connected by the horizontal pivot pin 19 and housed in the sleeve 20.

Studs 21 threaded into the sleeve to enter grooves in the surface of the adjacent ends of the axle 11' normally restrain relative movement of the outer section of the axle carrying the ground engageable wheel 6.

The inner section of the axle 11' secured in the socket 7' attached to the wheel 10' as previously described, has formed therein a collar 23 bearing against a thrust bearing or collar 24 carried upon the axle section.

The collar 24 has a pair of diametrically opposite parallel extension arms 24a apertured as at 25 to receive the studs 26 which are threaded into cylindrical body 27 of the socket 7'.

The arrangement is such that the axle 11' is effectively supported at the inner end without rotating whereby the ground engageable wheel 6 is normally idle.

Upon the release of the studs 21, the sleeve 20 may be axially moved onto the inner section of the axle 11' to clear and permit relative angular movement of the outer section of said axle carrying the ground engageable wheel 6 about the pivot pin 19 to locate said wheel in the upper horizontal parked position above the main wheel W of the tractor T as viewed upon the left hand side of Fig. 4.

The ground engageable wheel 6 is manually raised to the above position and retained therein by the clamping device upon the tractor indicated generally at 30.

The device consists of the U bolt 31 upon the end of the horizontal link 32 above the main wheel of the tractor, which link is hinged as at 33 to the link 34 attached to the inner side of the mudguard 35. The U bolt 31 has a keeper 36 thereon and upon the ground engageable wheel 6 being raised to the vertical, the location of U bolt is such that it centres upon the axle section 11, and the keeper 36 is threaded home to prevent said wheel from falling to the lower and normal position.

As viewed upon the left hand side of Fig. 4 the ground engageable wheel 6 is disposed above and projects across the adjacent main wheel W of the tractor whereby the overall width of the tractor and pair of stabilizing supports is substantially reduced for the convenient driving of the tractor through gateways and to and from the working site. The outer link 32 is thrown back and clipped to the upper edge of the mudguard 35 of the tractor when not in use.

Figure 7:
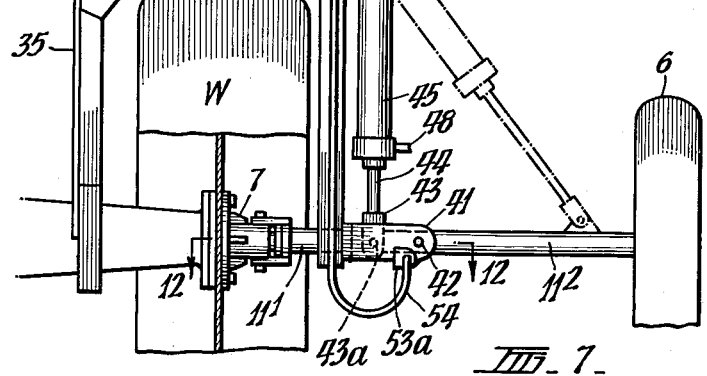
Fig. 7 illustrates one form of power operated means for raising the ground engageable wheel to the parked position.
Figure 8:
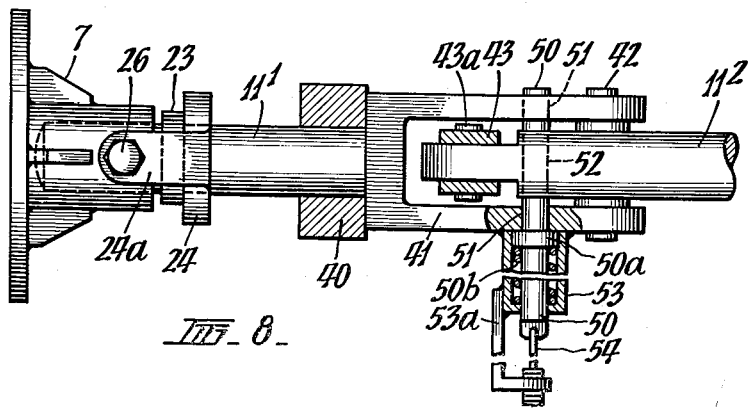
Fig. 8 is a view in section of the divided axial extension employed with the power operated means illustrated in Fig. 7.

Referring now to Figs. 7 and 8 it is to be observed that the outer axle section of the divided axle 11" carrying the ground engageable wheel 6 is power operated to be raised and lowered at will between the operative and parked positions shown in Fig. 4.

Figure 6:
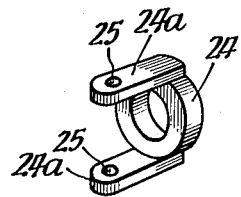
Fig. 6 is a view in perspective of the collar, or bearing upon the inner end of the axle of the stabilizing support.

To that end the mudguard 35 of the tractor has one side of a yoke 40 attached thereto, and extending above the main wheel W, the other outer side of the yoke forming a hanger to support the axle 11² which is rotatably supported in the socket 7' in the manner described with reference to Figures 5 and 6.

The inner axle section is bifurcated as at 41 to be pivotally connected as at 42 to the outer axle section carrying the ground engageable wheel 6.

This end of the outer axle section is extended inwardly of the pivot pin 42 and reduced to pivotally connect as at 43a the bifurcated end 43 of the piston rod 44 of a hydraulic piston and cylinder power unit 45, as viewed in Fig. 8.

The power unit 45 is pivotally suspended from the bracket 46 at the corner of the yoke 40 and is of the double acting type having the end ports 47—48 to be connected to the pressure liquid supply lines (not shown), controllable by selector valvular mechanism accessible from the driving position or seat of the tractor in the conventional manner.

Upon the admission of pressure liquid to the upper port 47, the piston rod 44 is projected from the cylinder to effect an anti-clockwise movement of the outer axle section to thereby raise the ground engageable wheel 6 to the vertical parked position. The hydraulic power unit 45 being pivoted within the bracket 46 self aligns with the axle section during the angular movement of the latter in raising the ground engageable wheel 6.

To prevent accidental relative movement of the outer axle section whilst the ground engageable wheel 6 is in the operative position, there is provided a slidable locking pin 50 mounted upon the bifurcated end 41 of the inner axle section to normally fit aligning apertures 51 therein disposed in alignment with the diametrical aperture 52 in the outer axle section as viewed in Fig. 8.

This locking pin 50 has a collar 50a seating against one side of the above bifurcated end 41, and projects through a housing 53 attached to that side and in which a spring 50b is wound upon the locking pin 50 to resist the retraction of the latter.

A depending angular lug 53a provides a support for the end of a Bowden wire 54 connected to the outer end of the locking pin 50. The other control end of the Bowden wire 54 is supported in the bracket 54a attached to the upper side of the yoke 40 and fitted with the finger piece 54b for the operation of the Bowden wire from the driver's seat of the tractor T.

Upon the Bowden wire being pulled by the finger piece 54b, the locking pin is axially retracted from the apertures 51 and 52 against the resistance of the spring 50b leaving the pivotal outer axle section free to describe an angular movement about the pivot pin 43a. The ground engageable wheel 6 is thus positively maintained in the outer or lower operative position by the locking pin 50 which is only withdrawn by a pull upon the Bowden wire 54 when said wheel is to be raised to the vertical position by the energization of the hydraulic power unit 45.

The hydraulic power unit 45 may be arranged as shown in dotted lines, Fig. 8 whereby the piston rod is pivotally connected to the outer axle section adjacent the ground engageable wheel 6. In this arrangement the ground engageable wheel is raised upon the piston rod being retracted. In lieu of the hydraulic power unit described a mechanical device such as a control lever accessible from the driver's seat may be provided to raise and lower the ground engageable wheel 6 through suitable linkage connected to the outer pivotal axle section carrying said wheel 6.

Figure 9:
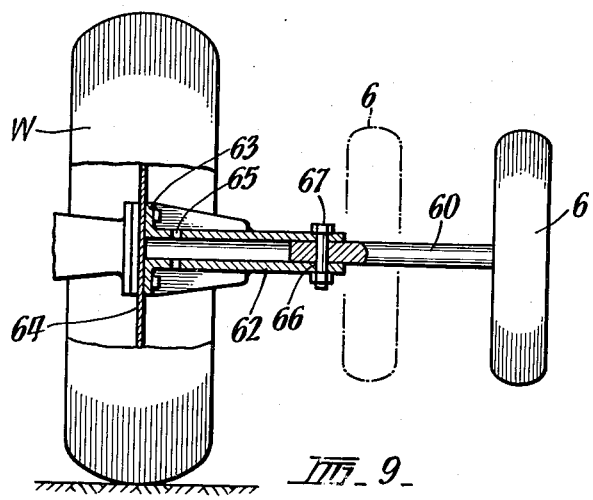
Fig. 9 is a view of a further modification of the stabilizing support including a telescopic axle for the ground engageable wheel to permit the retraction of the latter from the operative to the parked pjosition.

As viewed in Figure 9 the axle 60 carrying the ground engageable wheel 6 is of telescopic construction to permit said wheel to be axially moved between an extended operative position (shown in full lines) and a retracted parked position (shown in dotted lines) for the purpose hereinbefore described.

To that end the hollow boss 62 of the enlarged socket 63 attached to the wheel centre 64 is extended or of greater length and the one piece axle 60 is relatively shorter than the divided axle shown in Fig. 1.

The boss 62 has an inner and outer pair of diametrically opposite apertures indicated at 65 and 66 respectively to receive the holding bolt 67 to retain the axle 60 in either a projected or retracted position with the ground engageable wheel 6 in either the operative or parked position. Power operated means may be provided to move the axle 62 to locate and retain the ground engageable wheel in either the operative or parked position.

Figure 10:
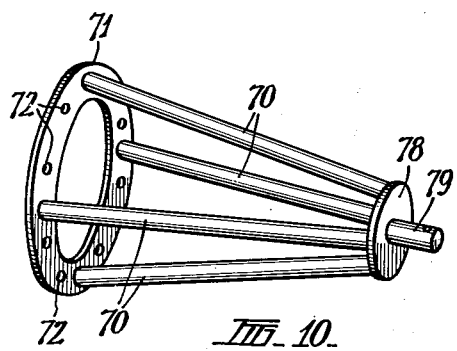
Fig. 10 is a further modification of the stabilizing support.
Figure 11:
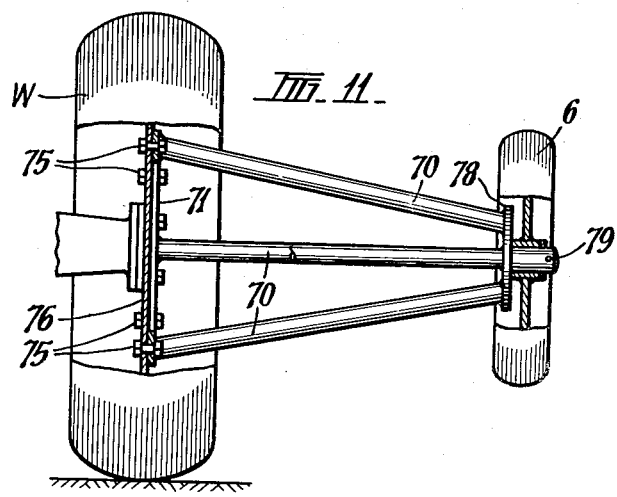
Fig. 11 illustrates the structure of Fig. 10 in its environment.

In the modification illustrated in Figures 10 and 11 the stabilizing support consists of a number of corresponding convergent members 70 attached at the inner ends to an apertured discal plate 71 having a number of uniformly spaced bolt holes 72 radially spaced to coincide with the spacing of the existing bolts 75 upon the wheel centre 76 of the main wheel.

Upon the removal of the bolts the discal plate 71 may be fitted to the wheel centre 76, and the bolt holes 72 centering with the bolt holes therein, permit the attachment of the discal plate by the use of the existing bolts 75.

The convergent members 70 forming in outline a truncated cone coaxial with the axle of the main wheel W are attached at the outer end to a vertical solid discal plate 78 carrying a stub axle 79 upon which the ground engageable wheel 6 is mounted in the manner shown in Fig. 3.

The convergent members rotate in unison with the main tractor wheel W and are arranged with the stub axle 79 to locate the ground engageable wheel 6 coaxial with, or in axial alignment with the axle of the tractor wheel W.

As shown in Fig. 10 the ground engageable wheel 6 is of the same reduced diameter relatively to the main wheel W as hereinbefore described. The convergent members are preferably covered by a sheet metal casing to prevent reeds and the like growth from becoming tangled in and around said members.

If desired the convergent members 70 may have angular slotted ends for direct attachment to the wheel centre 64 in lieu of the apertured discal plate 71.

In all the practical arrangements hereinbefore described the ground engageable wheel 6 is of reduced diameter relatively to the main wheels W of the tractor T so as to be normally located well clear of the ground.

However the diameter of the ground engageable wheel 6 relative to the diameter of the main tractor wheels W is such that should the tractor tilt sidewardly and assume a dangerous inclination, the ground engageable wheel upon the relatively lower side of the incline will contact the ground to serve as a movable prop against further inclination of the tractor as it moves over the ground to thereby stabilize the latter to permit the driver to take what action is necessary for his protection and that of the tractor. By "critical" or "dangerous" inclination is meant the inclination approaching the inclination at which the tractor would fall or topple sidewardly down the incline if unsupported. The rolling or movement of the stabilizing wheel in unison with the movement of the main wheels prevents the toppling over of the tractor as it keeps the latter moving. Importantly the tractor is prevented from slewing and is effectively stabilized to remain mobile for control by the driver.

By maintaining a low pressure in the tyres of the ground engageable wheels 6 the shock impact of the latter upon the ground is absorbed and the wheels will roll in unison with the main wheels and thus contribute materially to the efficiency of the stabilizing device and resultantly the safety of the driver.

Figure 12:
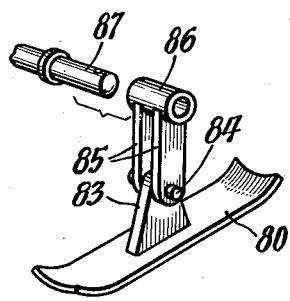
Fig. 12 is a view of the ground engageable skid to be utilised in lieu of the rubber tyred wheel, illustrated in Figs. 1, 3 and 4.

Referring to Fig. 12, it will be observed that the ground engageable wheels 6 may be replaced by a runner or skid 80 which is mounted upon the outer end of the axle so as to be non rotatable and to freely slide over the ground upon contacting the latter.

To that end the central vertical lug 33 of the runner or skid 80 is pivotally suspended as at 84 from a pair of parallel radial arms 85 integral with the sleeve 86 to be freely fitted upon the end of the axle 87 in the manner illustrated in Fig. 3 for the mounting of the ground engageable wheel. Thus the runner or skid 80 is freely mounted to remain horizontal so as to slide over the ground upon contact with the latter.

Any other suitable power operated means controllable at will from the driver's seat of the tractor may be provided for raising the outer pivotal axle section and attached wheel to the inner parked position.

For instance there may be provided a hoist including a winch the cable of which extends about the jockey pulleys carried upon the arms of the above-mentioned yoke and is connected to the outer axle section. The winch may be operated by an electric motor or shaft driven from the power take off shaft of the tractor. The wheel or skid is raised by imparting the drive to the winch through the electric motor or the power take off shaft.

The ground engageable wheel or skid may be dropped to the operative position by releasing the hand or foot brake of the winch, whereupon a pin is inserted through the coupling of the pivotal section to restrain movement of the wheel or skid, in the operative position.

The wheel is preferably fitted with a rubber tread or pneumatic tire and may constitute a reversible dish shaped wheel. If a roller is preferred due to the working conditions, it may be provided with a flange at one side of appropriate variable diameter.

I claim:

1. For a tractor or the like power motivated vehicle including main transport wheels, a safety attachment to prevent sideward falling over of said vehicle comprising a stabilizing support, means to detachably connect one end of the stabilizing support to a main transport wheel of said vehicle so as to project laterally in coaxial relation with said wheel, and a ground engageable member carried upon the other end of said support above ground level, being located and adapted upon said vehicle assuming a critical lateral inclination to assume ground engagement to move with and stabilize said vehicle.

2. For a tractor or like power motivated vehicle including main transport wheels, a safety attachment to prevent sideward falling over of said vehicle, comprising a stabilizing support, means to detachably connect one end of the stabilizing support to a main transport wheel of said vehicle so as to project laterally in coaxial relation with said wheel, and a wheel freely mounted upon the outer end of the stabilizing support, being of predetermined reduced diameter relative to the main wheels so as to engage the ground, upon said vehicle assuming a critical lateral inclination, to move with and stabilize the vehicle.

3. For a tractor, or like power motivated vehicle including main transport wheels, a safety attachment to prevent sideward falling over of said vehicle comprising a stabilizing axle, means to detachably connect one end of the said axle to a main transport wheel of said vehicle so as to project laterally in coaxial relation with said wheel, and a wheel freely mounted upon the outer end of the axle, being of reduced diameter relative to the main wheel so as to engage the ground, upon said vehicle assuming a critical lateral inclination, to move with and stabilize said vehicle.

4. For a tractor including main transport wheels, a safety attachment to prevent sideward falling over of the tractor comprising a divided axle forming releasable inner and outer axle sections normally disposed in extended axial relation, means to detachably connect the inner axle section to a main transport wheel so as to project laterally in coaxial relation with said wheel, and a ground engageable member freely mounted upon the outer end of the outer axle section for normal disposition above ground level, being located and adapted upon the tractor assuming a critical lateral inclination to assume ground engagement to move with and stabilize the tractor.

5. A safety attachment according to claim 4, wherein the outer axle section is disconnectable from the inner section, and said means permit, upon removal of the inner axle section, the attachment of the outer axle section to the main transport wheel so as to reduce the overall width of the tractor and the attachment.

6. Safety attachment according to claim 4, wherein the ground engageable member consists of a wheel of a predetermined reduced diameter relatively to said main wheel.

7. A safety attachment according to claim 4, wherein the outer axle section is pivotally connected to the inner axle section for relative angular movement upon release to locate the ground engageable member in an inner parked position.

8. In a safety attachment according to claim 6, means for retaining the ground engageable member in operative position.

9. In a safety attachment according to claim 4, power operated means to angularly move the outer axle section carrying the ground engageable member between the extended operative position and inoperative position.

10. In a safety attachment according to claim 6, means to releasably lock the outer axle section carrying the ground engageable member in operative position.

11. A safety attachment according to claim 8, wherein the power operated means comprises a double acting hydraulic piston and cylinder assembly pivotally suspended upon the tractor, the piston rod of which assembly is pivotally connected to the outer axle section carrying the wheel so as to angularly move the latter responsive to the actuation of said assembly, for the purpose herein specified.

12. A safety attachment according to claim 4, wherein said means comprises a socket attached to the wheel centre of said main wheel in which socket the inner end of the inner axle section is removably mounted.

13. For a tractor or like power motivated vehicle, a safety attachment to prevent sideward falling over of said vehicle, comprising a stabilizing structure having a number of outwardly projecting and converging members coaxially and symmetrically attached at the inner ends to each one of the main transport wheels of the vehicle and at the outer ends to each other, a ground engageable member carried by said members at the outer ends in a transport position above ground level and adapted upon the vehicle assuming a critical lateral inclination in traversing an incline or hillside to assume ground engagement to move with and stabilize said vehicle.

14. In a tractor or like power motivated vehicle, a safety means according to claim 13, wherein the ground engageable member consists of a wheel of predetermined reduced diameter relatively to the diameter of said transport wheels and coaxial with the latter.

15. A safety attachment according to claim 4, wherein the inner and outer axle sections are telescopically connected, the outer section carrying the ground engageable member being relatively extendible and contractible for the purpose herein specified.

16. A safety attachment according to claim 3, wherein the stabilizing axle is divided to form inner and outer axle releasable sections, the latter section carrying the ground engageable wheel being relatively extendible and contractible to locate said wheel in an outer operative position and in an inoperative position.

References Cited in the file of this patent

UNITED STATES PATENTS

| | | |
|---|---|---|
| 809,266 | Lafever et al. | Jan. 2, 1906 |
| 2,513,584 | O'Leary | July 4, 1950 |
| 2,668,597 | King | Feb. 9, 1954 |
| 2,804,157 | Preston | Aug. 27, 1957 |

FOREIGN PATENTS

| | | |
|---|---|---|
| 588,059 | France | Jan. 26, 1925 |
| 726,592 | France | Mar. 7, 1932 |